(12) United States Patent
Jarry et al.

(10) Patent No.: US 6,563,046 B1
(45) Date of Patent: May 13, 2003

(54) APERTURED PLATE AND SUPPORT FIXING DEVICE

(75) Inventors: Patrice Jarry, Mont Saint Jean (FR); Raphael Decore, Parennes (FR)

(73) Assignees: Legrand, Limoges (FR); Legrand SNC, Limoges (FR)

( * ) Notice: Subject to any disclaimer, the term of this patent is extended or adjusted under 35 U.S.C. 154(b) by 0 days.

(21) Appl. No.: 09/856,900

(22) PCT Filed: Nov. 25, 1999

(86) PCT No.: PCT/FR99/02917

§ 371 (c)(1),
(2), (4) Date: Aug. 21, 2001

(87) PCT Pub. No.: WO00/33436

PCT Pub. Date: Jun. 8, 2000

(30) Foreign Application Priority Data

Nov. 27, 1998 (FR) .............................................. 98 14943

(51) Int. Cl.[7] ................................................ H01J 15/00
(52) U.S. Cl. ............................. 174/50; 174/58; 174/60; 220/4.02; 248/906; 439/535
(58) Field of Search ......................... 174/63, 50, 17 R, 174/53, 54, 57, 58, 60, 48; 220/3.2, 3.3, 3.5, 3.92, 3.94, 4.02; 439/535, 536; 248/906

(56) References Cited

U.S. PATENT DOCUMENTS

| 2,625,288 | A | * | 1/1953 | Clark et al. ................. 220/3.94 |
| 4,135,633 | A | * | 1/1979 | Lockwood et al. ......... 220/3.94 |
| 6,005,188 | A | * | 12/1999 | Teichler et al. ......... 220/4.02 X |
| 6,069,315 | A | * | 5/2000 | Tang ............................ 174/50 |
| 6,369,320 | B1 | * | 4/2002 | Okamoto ..................... 174/50 |

FOREIGN PATENT DOCUMENTS

| EP | 0 600 109 | 6/1994 |
| FR | 2 698 738 | 6/1994 |
| WO | WO 96/24183 | 8/1996 |

* cited by examiner

Primary Examiner—Dean A. Reichard
Assistant Examiner—Dhiru R Patel
(74) Attorney, Agent, or Firm—Young & Thompson

(57) ABSTRACT

An apparatus support used for example inside a box may have on each of its opposite sides groove elements for being mounted on the side units of a wireway base when the base has such side units. Associated with the support by way of mechanical fastening element, is a plate having at least two projecting columns, with on the top part of the columns, snap-on elements, and the support correspondingly includes snap-on elements matching the snap-on elements of the plate columns.

16 Claims, 6 Drawing Sheets

APERTURED PLATE AND SUPPORT FIXING DEVICE

BACKGROUND OF THE INVENTION

The present invention relates generally to device supports of the type used to fix a device of any kind or, to be more precise, to fix its mechanism.

It relates more particularly to the situation in which, in the case of electrical devices, fixing is effected in conjunction with the use of trunking to route electrical conductors or cables connected to the devices.

DESCRIPTION OF THE RELATED ART

Trunking includes a base section, which has an open cross section, and a cover section, which is adapted to be attached to the base section to close the trunking. This is known in the art.

Several ways of fixing this kind of trunking can be envisaged.

First of all, the fixing can be inside the trunking itself or, to be more precise, inside its base section.

This is more particularly feasible when the base section, which has a generally U-shaped cross section, has a middle part and two lateral flanges with rims along the free edges of the lateral flanges which extend toward each other and to which the cover section is clipped.

It is then sufficient to use a dedicated device support provided with lateral groove means for engaging it over the rims of this kind of base section, between two lengths of cover section.

A device of this type is described in French patent 2 698 738 filed Dec. 1st, 1992 under application number 92 14441.

A device mechanism can instead be fixed into a box which is in turn installed on the trunking (or, to be more precise, on the base section of the trunking) between two lengths of cover section, or alongside the trunking, to which it is then joined by a canopy which caps the base section of the trunking transversely to provide a passage for the electrical conductors or cables concerned, or at a distance from the trunking, to which it is then connected by a branch trunking which routes the electrical conductors or cables.

The box can also be used on its own, without any trunking, for example at the end of a built-in conduit.

In each of the above cases specific arrangements are employed for fixing the device mechanism into the box, with or without a specific individual device support.

SUMMARY OF THE INVENTION

A general object of the present invention is an arrangement which has the advantage of using the same fixing device in all foreseeable fixing circumstances, which is beneficial from the point of view of standardizing production and therefore from the point of view of cost.

To be more precise, the invention firstly provides a device support, characterized in that it is associated with a fitting accessory in the form of a plate which has at least two projecting pillars and clipping means at the top of each of the pillars, and in that it further includes clipping means in corresponding relationship to and complementary to the clipping means on the pillars on the plate, by means of which it can therefore be attached thereto; it also provides a box within which the above kind of device support and the above kind of plate can be used.

Thanks to the plate associated with the device support according to the invention, a device mechanism can be fixed to trunking, alongside trunking or at a distance from trunking, or used without any trunking, the same device support and, in the usual way, an appropriate box being used in each case.

The device support according to the invention therefore has the advantage that its great flexibility means that it suits the various corresponding installation conditions.

However, a preferred embodiment of the device support also has lateral groove means that enable it to be fitted, if required, to the rims of the base section of trunking which includes such rims. This further extends its field of application.

Conversely, it is also possible to consider that it is the plate associated with the device support, in accordance with the invention, that increases the field of application of device supports including lateral groove means of the above kind, by enabling them to be fitted into a box.

Be this as it may, the device support according to the invention has the advantage of being quasi-universally suitable for all the usual fixing methods.

UK patent application 2 187 900 describes a box which is associated with a fitting accessory consisting of a plate with projecting pillars for clipping it on.

However, that box does not constitute a device support in the sense of the present invention.

In particular, it could not be used in any other box or incorporate any lateral groove means.

Also, the pillars of the associated plate are merely clips.

BRIEF DESCRIPTION OF THE DRAWINGS

Features and advantages of the invention will emerge from the following description, which is given by way of example and with reference to the accompanying diagrammatic drawings, in which.

DESCRIPTION OF THE PREFERRED EMBODIMENTS

FIGS. 1 to 7 show, by way of example, the application of the invention to the situation in which the device mechanism, not shown, to be fixed must be installed so that it projects from trunking 10.

Because the trunking 10 is not in itself relevant to the present invention it will not be described in complete detail here.

Globally, the trunking 10 includes a base section 11, by means of which it is adapted to be attached to a wall of any kind, not shown, and which has an open cross section, and a cover section 12 which, to close the trunking, is adapted to be attached to the base section 11, for example to be clipped to it, as shown here.

Figure 1:
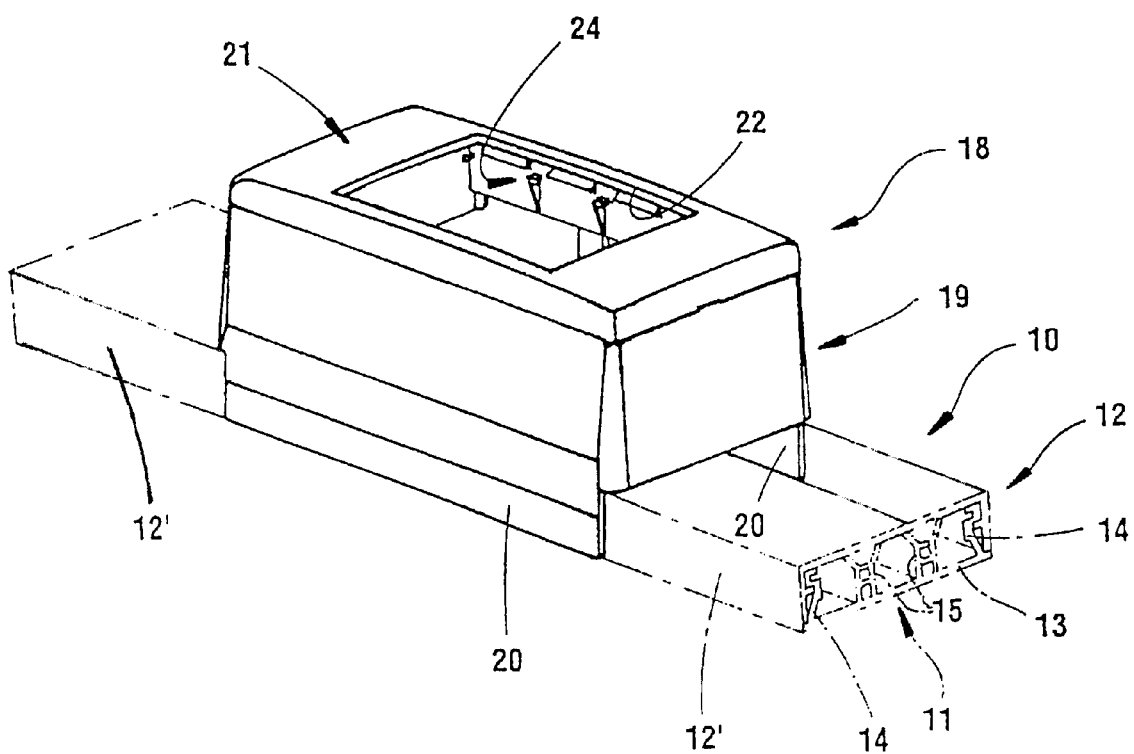
FIG. 1 is a perspective view of a box containing a device support according to the invention.
Figure 6:
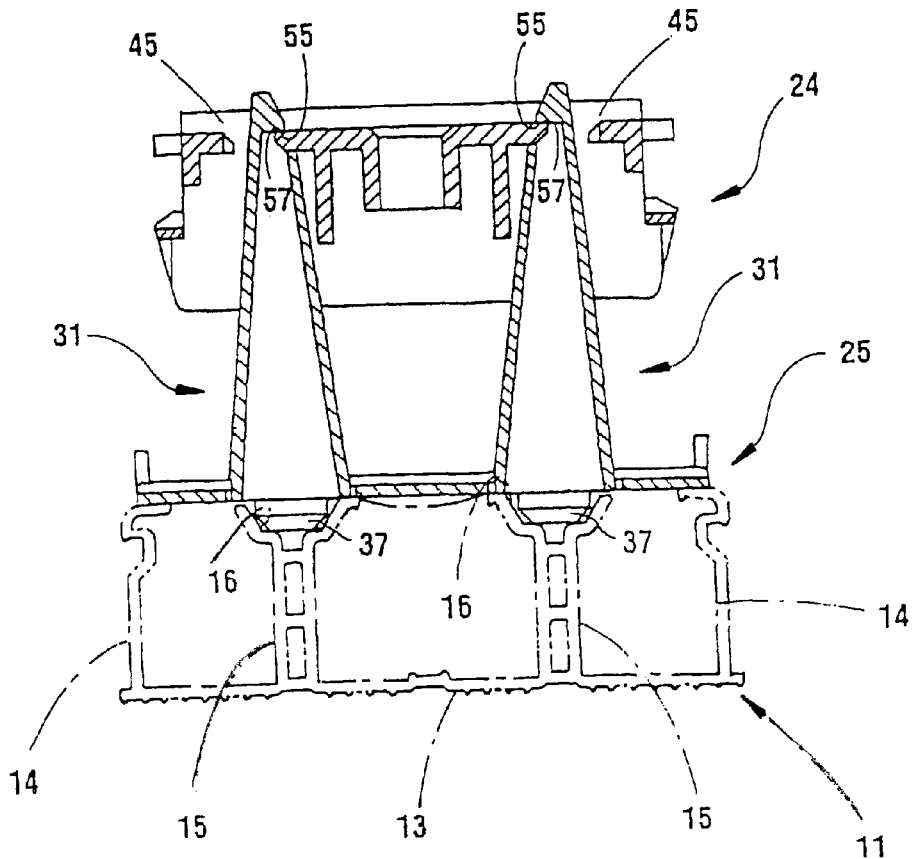
FIG. 6 is a view in section of the assembly and is derived from FIGS. 4 and 5.

In the embodiment shown more particularly in FIGS. 1 and 6, and as shown in dashed outline in those figures, the base section 11 has a U-shaped profile in cross section with a middle part 13 and two lateral flanges 14. It includes two spaced internal partitions 15 which extend longitudinally and parallel to the lateral flanges 14 over its entire length. In this embodiment, each of them is formed with a channel 16 along its free edge and each of them is more or less hollow.

As a corollary to this, in this embodiment, the cover section 12 itself has a U-shaped profile in cross section and caps the entire height of the base section 11.

In this case, the device mechanism concerned is fixed to trunking 10 of this kind in a manner known in the art, inside a box 18 which is itself adapted to be attached to and project from the base section 11 between two lengths 12' of cover section 12.

Finally, in a manner that is known in the art, the box 18 has an external lid 19 in the shape of a frame with upstanding edges 20 adapted to engage over the base section 11, capping it locally, and a front plate 21 which covers the lid 19 and which has an opening 22 in its central area through which passes the part of the device mechanism accessible to the user, the front plate thus forming an embellisher around that part of the device mechanism.

Figure 2:
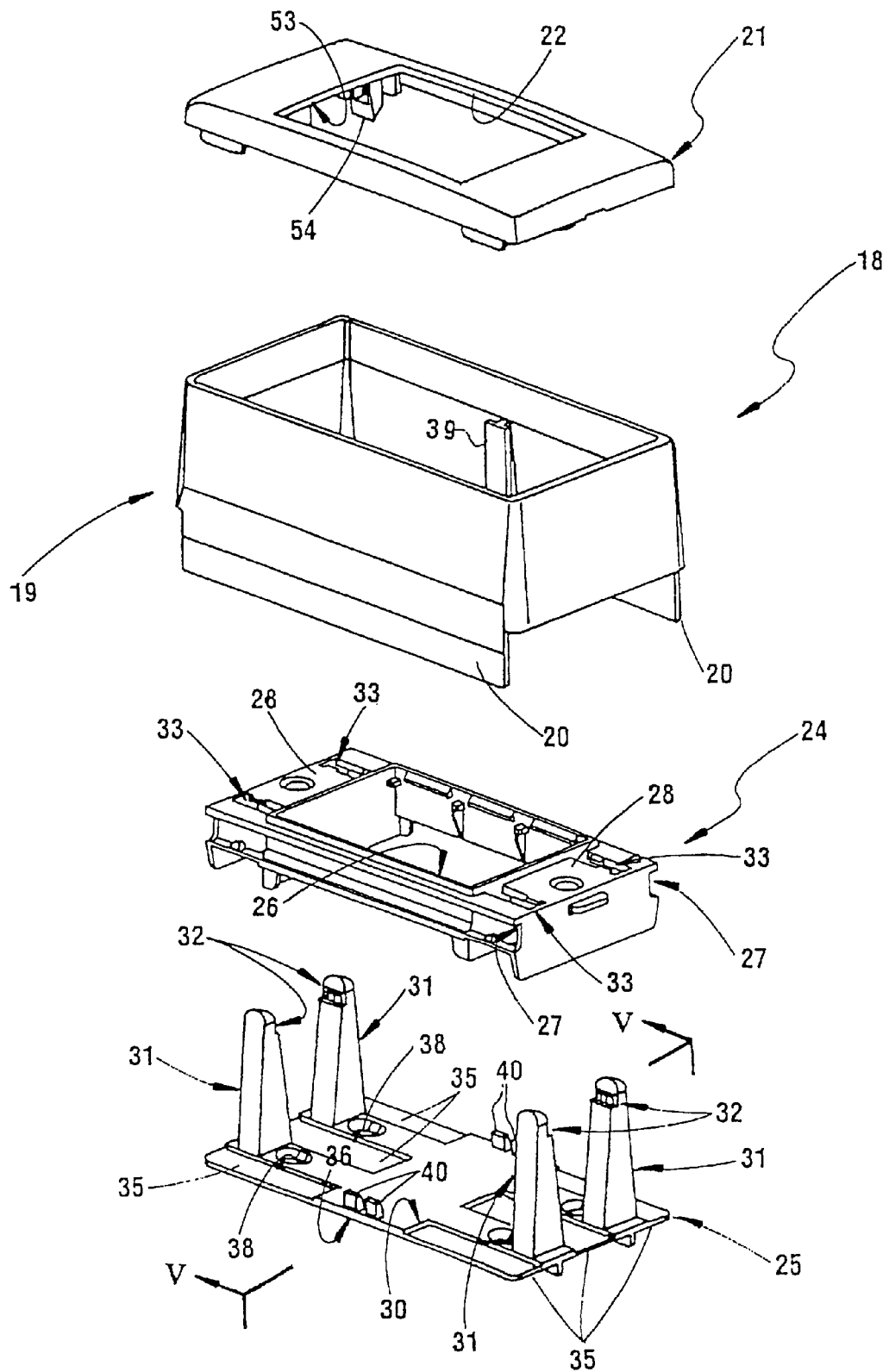
FIG. 2 is an exploded perspective view of the box and the device support.
Figure 3:
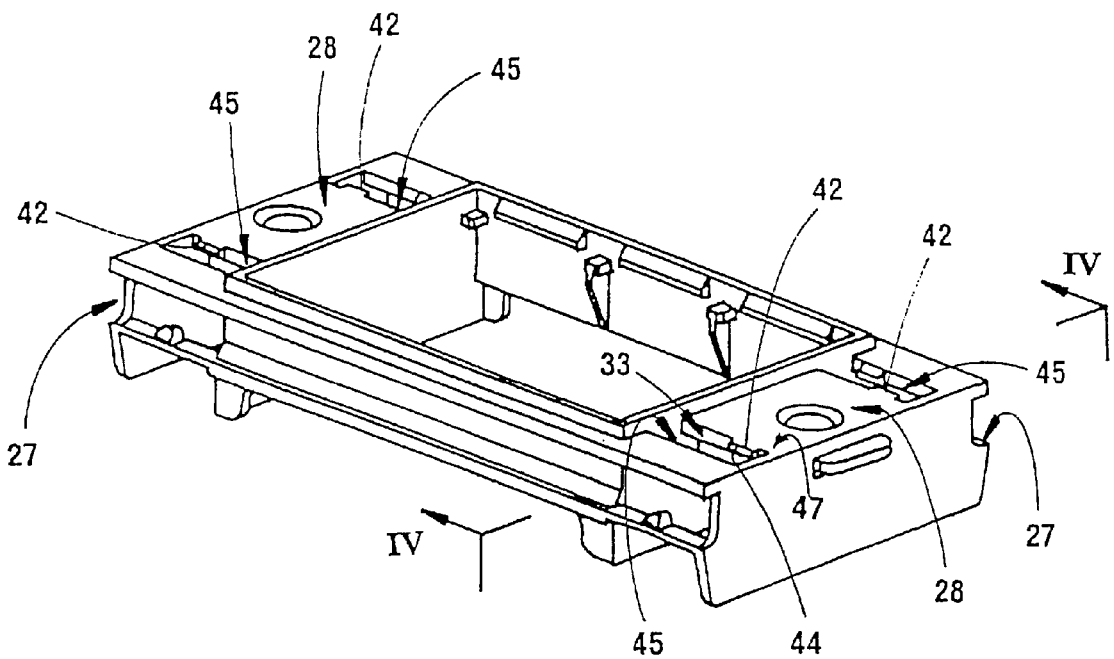
FIG. 3 is a perspective view to a larger scale of the device support shown in isolation.

In accordance with the invention, a device support 24 is used inside the box 18, as can be seen better in FIG. 2, receives the device mechanism to be fixed directly, and is associated with a fitting accessory in the form of a plate 25.

In the embodiment shown the device support 24 takes the general form of a globally parallelepiped-shaped plate with an opening 26 in its central area.

The overall features of the device support 24 are known in the art.

In particular, it has on each of at least two opposite sides groove means 27 that, if the base section 11 of the trunking 12 has rims along the free edge of its lateral flanges 14, can be engaged over those rims, as described in the published French patent 2 698 738 previously referred to.

The device support 24 is therefore not described in complete detail here.

Only its components necessary to an understanding of the invention are described.

In the embodiment shown, the opening 26 in the device support 24 extends in the lengthwise direction over only a fraction of the length of the device support 24, leaving a seat 28 at each of its transverse ends.

As a corollary to this, in this embodiment, the groove means 27 extend along only the longitudinal sides of the device support 24.

In accordance with the invention, the plate 25 associated with the device support 24 has at least two pillars 31 projecting from its top surface 30 with, as described in more detail later, clipping means 32 at the top of each pillar 31, and the device support 24 conjointly itself includes, also as described in more detail later, clipping means 33 that are in corresponding relationship to and complementary to the clipping means 32 on the pillars 31 on the plate 25, and by means of which it can be attached thereto.

In the embodiment shown, the plate 25 is thin and relatively flat and its contour is globally rectangular.

What is more, in this embodiment, it has along each of its transverse sides three parallel portions 35 of reduced thickness, one in each corner area and one between the latter.

Adapted to be cut easily, these thinner portions 35 can provide passages for electrical conductors or cables, if required.

In the embodiment shown, the plate 25 has four bosses 37 projecting from its bottom face 36 between the thinner portions 35 and at the corners of a rectangle, so that it can be nested over the partitions 15 of the base section 11 because of the channel 16 that they form. Each boss includes a bore 38 through which is passed a fixing member, not shown. The fixing members pass through openings in the corresponding partition 15 of the base section 11 and are then anchored into the underlying wall.

In the embodiment shown, the plate 25 also has two ribs 40 for locking the lid 19. The ribs project from its top surface 30, in the middle area of each of its longitudinal sides, along their free edge.

Finally, in the embodiment shown, the plate 25 has four pillars 31 projecting from its top surface 30 at the corners of a rectangle, in the vicinity of its transverse sides and between the thinner portions 35 along the latter sides.

In practice the pillars 31 are all identical and their clipping means 32 are all at the same level.

In practice, the clipping means 32 of each of the two pillars 31 in the vicinity of the same transverse side of the plate 25 are also in a face-to-face arrangement between the pillars 31.

Figure 4:
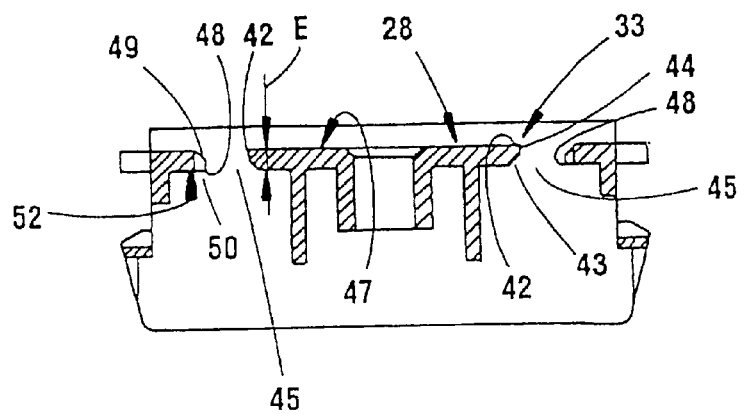
FIG. 4 is a view of the device support in cross section taken along the line IV—IV in FIG. 3.
Figure 5:
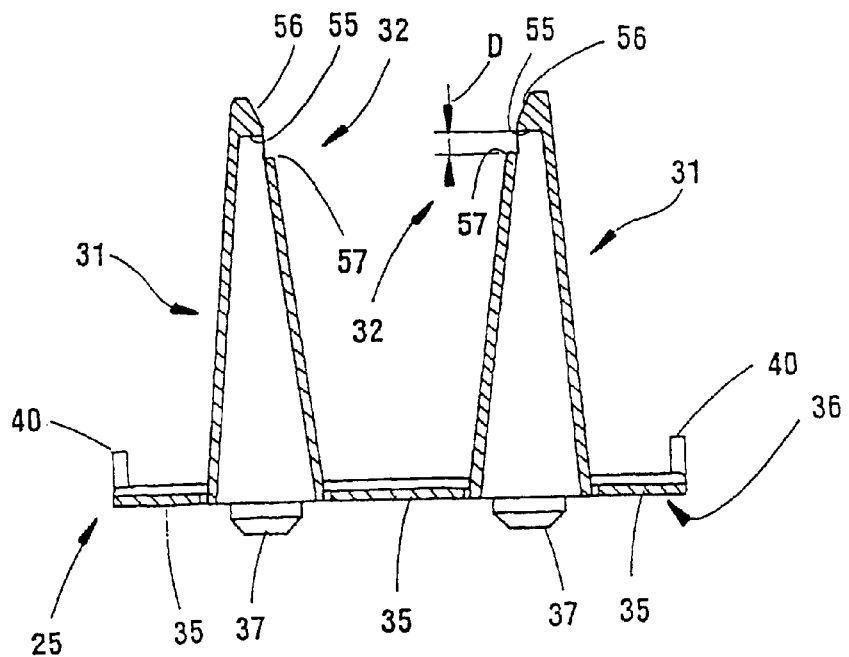
FIG. 5 is a view of the plate associated with it, in accordance with the invention, in cross section taken along the line V—V in FIG. 2.

For each of the pillars 31 on the associated plate 25, the clipping means 33 of the device support 24 simply consist of a detent 42 which, as shown in FIG. 4, is preferably preceded by a bevel 43 and in practice is parallel to the longitudinal sides of the device support 24.

In the embodiment shown the detent 42 is at the end of a tongue 44.

To be more precise, in this embodiment, the device support 24 has an opening 45 adapted to fit over each of the pillars 31 on the plate 25, and the corresponding detent 42 extends along at least part of one of the sides of the opening 45.

However, instead of being at the end of a tongue 44, the detent 42 could equally well consist of the edge of the opening 45.

In the embodiment shown, the opening 45 passes completely through the device support 24.

To be more precise, when, as here, the device support 24 includes a seat 28, at least locally in the area concerned, the opening 45 is in the seat 28 and passes completely through it.

In the embodiment shown, the device support 24 includes four openings 45, with two in each of the two seats 28, one for each of the pillars 31 on the plate 25.

In practice, the openings 45 have a globally rectangular contour and are elongate in the direction parallel to the longitudinal sides of the device support 24.

In the embodiment shown, each of the detents 42 forming the clipping means 32 of the device support 24 is level with the top surface 47 of the seat 28, being formed directly by that top surface 47.

When, as here, a front plate 21 on the opposite side of the plate 25 is associated with the device support 24, each of the openings 45 in the device support 24 adapted to fit over a pillar 31 on the plate 25 is conjointly adapted to contribute to clipping on the front plate 21.

To be more precise, for clipping on the front plate 21, another detent 48 extends over at least a part of the side of each of the openings 45 opposite the side along which the detent 42 constituting the corresponding clipping means 33 extends.

Like the detent 42, the detent 48 is preceded by a bevel 49 and is at the end of a tongue 50.

However, unlike the detent 42, the detent 48 is level with the bottom surface 52 of the corresponding seat 28, being formed directly by that bottom surface 52.

In practice, for each of the openings 45, the tongues 44 and 50 are offset longitudinally relative to each other.

As a corollary to this, the front plate 21 has four clips 54 flanking its opening 22, along transverse sides thereof and projecting from its bottom surface 53, with one clip 54 for each of the openings 45 in the device support 24, and the clips 54 are each adapted to cooperate with the corresponding detent 48 of the device support 24.

In the embodiment shown, the clipping means 32 of each of the pillars 31 on the plate 25 also include a detent 55 preceded by a bevel 56 and the detent 55 is on the upstream side of a shoulder 57 against which the corresponding seat 28 of the device support 24 bears.

Let E denote the thickness of the seats 28 of the device support 24.

In practice, the distance D between the detent 55 on a pillar 31 of the plate 25 and the shoulder 57 associated with that detent 55 is substantially equal to (slightly greater than) the thickness E of the seats 28 of the device support 24.

Although they are relatively rigid, the pillars 31 on the plate 25 are elastically deformable to a sufficient degree to enable the device support 24 to be clipped to them effectively.

In the embodiment shown, the pillars 31 are isolated from each other and, when seen in elevation, have a globally trapezoidal profile parallel to the transverse sides of the plate 25.

However, they are hollow, even if only for reasons connected with molding them.

Assembly can be carried out as follows, for example.

The plate 25 is first attached to the base section 11 of the trunking 10 and is then attached to the underlying wall by fixing members, as briefly described hereinabove.

The device support 24 is then clipped to the pillars 31 on the plate 25, before or after it receives the device mechanism to be fixed and before or after the latter has been wired.

The lid 19 is then fitted by engaging it over the device support 24, the plate 25, and the base section 11 of the trunking 10. Finally, the front plate 21 is clipped to the device support 24 through the lid 19, which is sufficient to retain the lid.

The lid 19 has a T-shaped profile rib 39 projecting from the middle area of each of the longitudinal sides of its bottom surface, adapted to be inserted between the corresponding ribs 40 of the plate 25.

If required, the lid 19 can also have clips, not shown, projecting from its bottom surface to strengthen the clipping together of the device support 24 and the plate 25, imparting to the resulting combination good mechanical resistance to impact.

Figure 7:
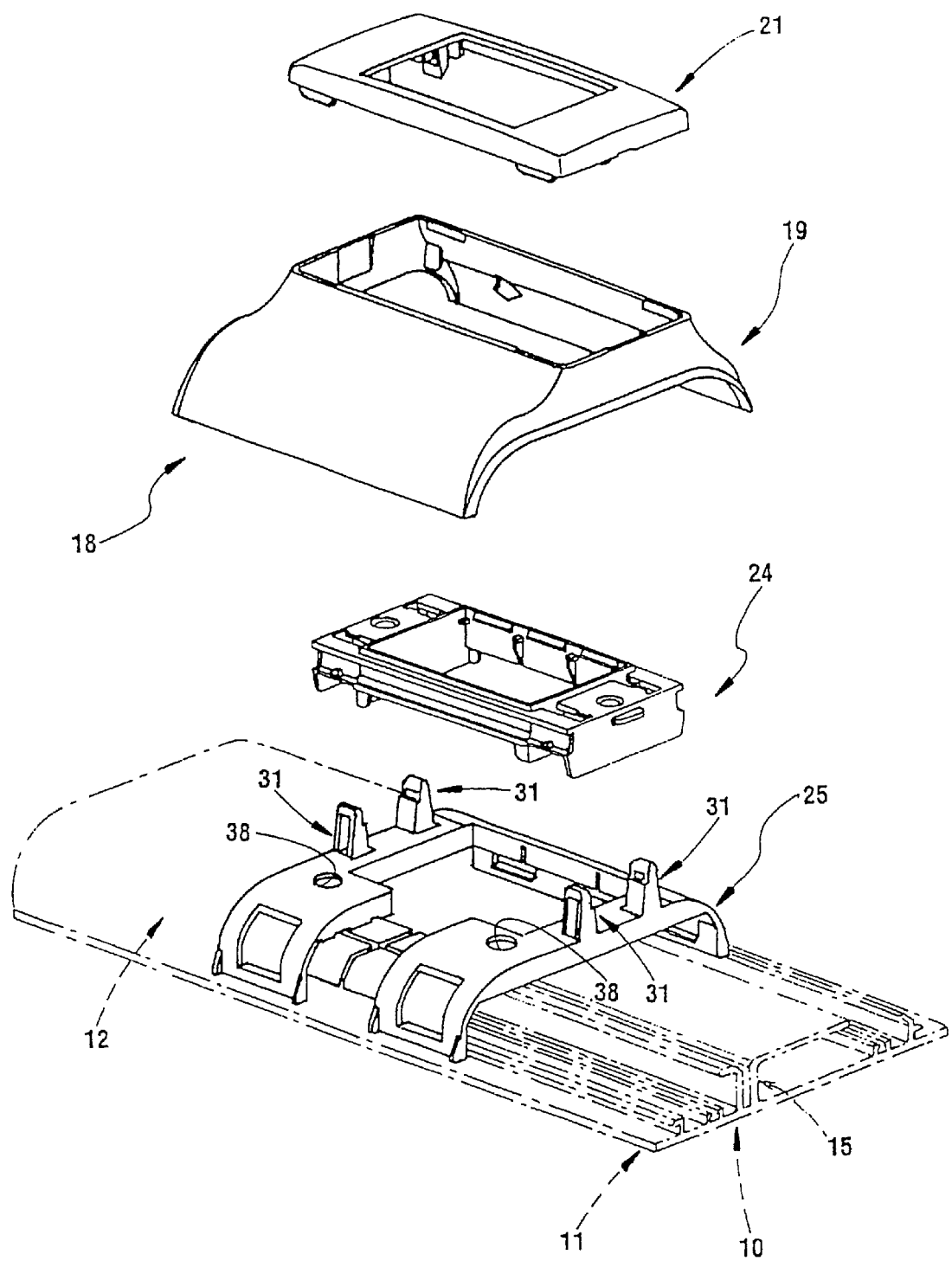
FIG. 7 is an exploded perspective view similar to that of FIG. 2 and relating to a different box.

FIG. 7 shows application of the invention to a situation in which the base section 11 of the trunking 10 has no lateral flanges 14, the cover section 12 of the trunking 10 covering the base section 11 directly.

In this case, the plate 25 associated in accordance with the invention with the device support 24 is merely shaped accordingly, like the cover section 12, and likewise the lid 19.

Also, it features only two bores 38, rather than four, and the base section 11 of the trunking 10 itself has only one partition 15, rather than two.

Otherwise, the features are of the same kind as previously described.

In particular, the device support 24 is advantageously unchanged.

Only the height of the pillars 31 on the plate 25 may be modified.

That height may be reduced, for example, as shown here.

Figure 8:
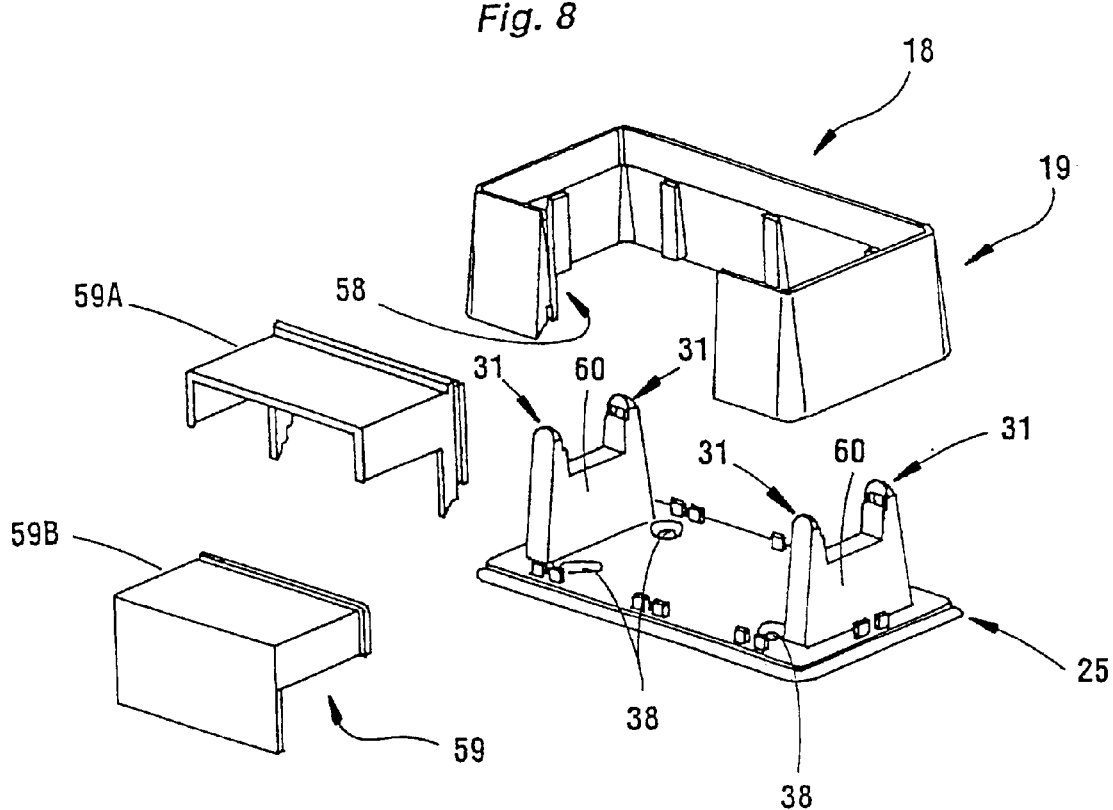
FIGS. 8 and 9 are perspective views similar to that of FIG. 2 and each relates to a respective different box, but without showing all of the component parts thereof.

FIG. 8 shows application of the invention to the situation in which, rather than being installed on trunking 10, the box 18 must be installed alongside trunking 10, not shown.

In this case, the lid 19 has on one of its longitudinal sides adjacent the trunking 10 an opening 58 into which is fitted a canopy 59 adapted to extend transversely over the base section 11 of the trunking 10.

In the embodiment shown, the canopy 59 is separate from the cover 19 and is in two parts 59A, 59B.

Instead of this, however, and in arrangements that are well known in the art and therefore not described in detail here, it can equally well be in one piece with the cover 19 and/or be made in one piece, rather than two pieces.

Otherwise, the features are of the same kind as previously described.

However, having to be fixed directly to the underlying wall, the plate 25 is relatively thicker than previously.

Moreover, in the embodiment shown, the pillars 31 on the plate 25 are linked in pairs by a partition 60 over at least a portion of their height starting from the plate 25.

In the embodiment shown, these partitions 60 are parallel to the transverse sides of the plate 25.

They increase the relative stiffness of the pillars 31.

Figure 9:
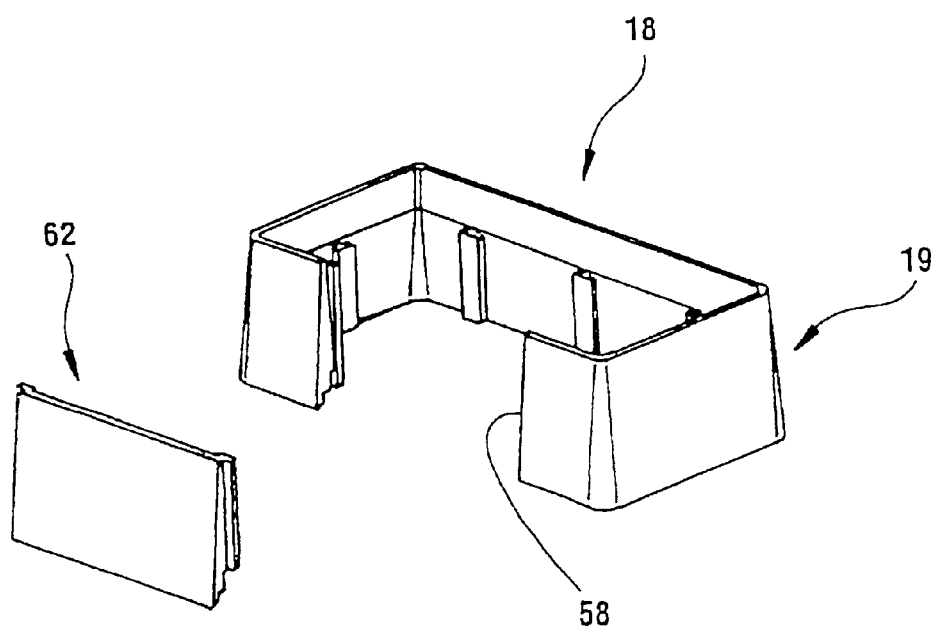

FIG. 9 shows application of the invention to a situation in which the box 18 must be installed at a distance from associated trunking 10, not shown.

In this case a blanking plate 62 is substituted for the previously described canopy 59, to blank off the opening 58 in the cover 19, and can be cut to enable branch trunking, not shown, to enter the cover 19.

The box 18 can equally well be used without any trunking.

It will have been noted that, in all cases, the plate 25 associated with the device support 24 in accordance with the invention includes attachment means for fixing it to any kind of support.

Such means can consist of the bores 38 that it can incorporate for fixing members adapted to anchor it into the underlying wall to be passed through.

However, in addition to and/or instead of this, when it is installed on the base section 11 of the trunking 10, the aforementioned means can be engagement means, for example clipping means, adapted to interengage with the base section 11.

The present invention is not limited to the embodiments and/or uses described and shown but encompasses any variant execution and/or combination thereof.

What is claimed is:

1. A fixing device including a device support (24) associated with a plate (25) with at least two pillars (31)

projecting from the plate with a first clipping means (32) at the top of each of the pillars (31) for attaching said device support (24), characterized in that the device support (24) takes the general form of an apertured plate with an opening (26) in a central area leaving a seat (28) at each of its transverse ends and including, on each of the two opposite sides, groove means (27) for installation on rims of a base section of trunking, said device support (24) including an opening (45) in each seat (28) for each of the pillars (31) of the plate (25), adapted to fit over one of said at least two pillars (31), each opening (45) being provided with a second clipping means (33) that are complementary to the first clipping means (32) on each of said at least two pillars (31) of the plate (25).

2. A fixing device according to claim 1, characterized in that the second clipping means (33) for each of the pillars (31) on the associated plate (25) simply consist of a detent (42).

3. A fixing device according to claim 2, characterized in that the detent (42) is preceded by a bevel (43).

4. A fixing device according to claim 2, characterized in that the detent (42) is at the end of a tongue (44).

5. A fixing device according to claim 2, characterized in that the detent (42) extends along at least part of one side of the opening (45).

6. A fixing device according to claim 1, characterized in that the opening (45) passes completely through the device support (24).

7. A fixing device according to claim 1, characterized in that the device is associated with a front plate (21) on the side opposite the plate (25) and the opening (45) in the device support contributes to clipping on the front plate (21).

8. A fixing device according to claim 7, characterized in that, for clipping on the front plate (21), the device support (24) includes another detent (48) that extends along at least a part of the side of the opening (45) opposite the side along which extends the detent (42) constituting the second clipping means (33).

9. A fixing device according to claim 1, characterized in that the first clipping means (32) on each of the pillars (31) on the plate (25) include a detent (55) on the upstream side of a shoulder (57) against which the device support (24) is adapted to bear.

10. A fixing device according to claim 9, characterized in that the distance (D) between the detent (55) on the pillars (31) on the plate (25) and the shoulder (57) associated with the detent (55) is substantially equal to the thickness (E) of each seat (28) of the device support (24).

11. A fixing device according to claim 9, characterized in that the detent (55) is preceded by a bevel (56).

12. A fixing device according to claim 1, characterized in that, although they are relatively rigid, the pillars (31) on the plate (25) are each elastically deformable to enable the device support (24) to be clipped to them.

13. A fixing device according to claim 1, characterized in that the plate (25) comprises four projecting pillars (31).

14. A fixing device according to claim 13, characterized in that the pillars (31) on the plate (25) are joined in pairs by a partition (60) over a fraction of their height starting from the plate (25).

15. A fixing device according to claim 1, characterized in that the plate (25) includes attachment means for fixing it to a support.

16. A box, characterized in that a fixing device according to claim 1 is used inside it.

* * * * *